(12) United States Patent
Ganesh et al.

(10) Patent No.: US 8,977,597 B2
(45) Date of Patent: Mar. 10, 2015

(54) GENERATING AND APPLYING REDO RECORDS

(71) Applicant: Oracle International Corporation, Redwood Shores, CA (US)

(72) Inventors: Amit Ganesh, San Jose, CA (US); Juan R. Loaiza, Woodside, CA (US); Krishna Kunchithapadam, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/073,832

(22) Filed: Nov. 6, 2013

(65) Prior Publication Data

US 2014/0067767 A1    Mar. 6, 2014

Related U.S. Application Data

(62) Division of application No. 12/469,637, filed on May 20, 2009, now Pat. No. 8,595,248.

(60) Provisional application No. 61/055,035, filed on May 21, 2008.

(51) Int. Cl.
*G06F 17/30*     (2006.01)
*G06F 11/14*     (2006.01)

(52) U.S. Cl.
CPC ............ *G06F 11/1474* (2013.01); *G06F 17/30* (2013.01)
USPC ........................................ 707/675; 707/741

(58) Field of Classification Search
USPC .................................................. 707/675, 741
See application file for complete search history.

(56) References Cited

U.S. PATENT DOCUMENTS

| 6,374,232 | B1 | 4/2002 | Dageville et al. |
| 6,438,562 | B1 | 8/2002 | Gupta et al. |
| 7,512,625 | B2 | 3/2009 | Lariba-Pey et al. |
| 7,702,683 | B1 | 4/2010 | Kirshenbaum |
| 2005/0038798 | A1 | 2/2005 | Sample |
| 2006/0184556 | A1 | 8/2006 | Tan et al. |
| 2009/0037456 | A1 | 2/2009 | Kirshenbaum et al. |
| 2009/0094236 | A1 | 4/2009 | Renkes et al. |
| 2009/0182726 | A1 | 7/2009 | Wang |

*Primary Examiner* — Mahesh Dwivedi
(74) *Attorney, Agent, or Firm* — Hickman Palermo Truong Becker et al LLP; Daniel D. Ledesma

(57) ABSTRACT

Techniques for maintaining a cascading index are provided. In one approach, one or more branch node compression techniques are applied to the main index of a cascading index. In an approach, a Bloom filter is generated and associated with, e.g., a branch node in the main index. The Bloom filter is used to determine whether, without accessing any leaf blocks, a particular key value exists, e.g., in leaf blocks associated with the branch node. In an approach, a new redo record is generated in response to a merge operation between two levels of the cascading index. The new redo record comprises (a) one or more addresses of blocks that are affected by the merge operation, (b) data is that being "pushed down" to a lower level of the cascading index, and (c) one or more addresses of blocks that are written to storage as a result of the merge operation.

24 Claims, 6 Drawing Sheets

US 8,977,597 B2

GENERATING AND APPLYING REDO RECORDS

CROSS-REFERENCE TO RELATED APPLICATIONS; BENEFIT CLAIM

This application is a Divisional of U.S. patent application Ser. No. 12/469,637, filed May 20, 2009, which claims benefit of U.S. Provisional Patent Application. 61/055,035, filed May 21, 2008, the entire contents of both of which are hereby incorporated by reference as if fully set forth herein.

This application is related to U.S. patent application Ser. No. 12/469,635, filed on May 20, 2009, the entire contents of which are hereby incorporated by reference as if fully set forth herein.

FIELD OF THE INVENTION

The present invention relates to storing and querying index structures.

BACKGROUND

In the last decade, after many years of focusing on fast retrieval times, the importance of index maintenance has increased due, at least in part, to the dramatic increase in the volume of data. For example, some Web companies track click streams on the Internet. Simply storing click streams in a database is not sufficient. Indexing those click streams is important in order to be able to efficiently query the data. There are numerous other applications that require high data rates into a storage system along with efficient queryability, i.e., using indexes.

A B-tree is a popular index structure. A B-tree typically comprises a root node, multiple branch nodes, and multiple leaf blocks that are referenced by the branch nodes. B-trees are generally efficient data structures to query. However, in terms of maintenance, B-trees exhibit numerous problems. Whenever a new row is added to an indexed object (e.g., a table), a corresponding B-tree is updated, which typically requires at least two disk I/O operations—one read disk I/O operation and one write disk I/O operation. A disk I/O operation is referred to hereinafter simply as a "disk I/O."

Additionally, a single indexed object typically has numerous B-trees "generated on" the indexed object. For example, an Employee table may include multiple columns (e.g., SSN, Last Name, First Name, Department, Salary) that each have a corresponding B-tree. Because only one B-tree on an indexed object tends to have clustering (locality), updates to keys in other B-trees typically incur random disk I/Os across the leaf blocks of the B-tree. B-tree updates thus become a significant limiting factor for overall database performance because each update operation on a table results in updating all B-trees on the table. For example, if a table is associated with ten B-trees, then 1,000 updates on the table requires approximately 20,000 random disk I/Os.

Many users (whether individuals or organizations) desire to have real-time indexing. A real-time index is an index that is updated in conjunction with, or immediately after, an addition or deletion to an object (e.g., a table) upon which the index is based (referred to herein as an "indexed object"). Thus, a real-time index is one that is immediately updated to reflect changes to the indexed object. Users typically do not want an index that is only current as of last week or even as of yesterday.

Thus, there are at least two issues with real-time indexing: storing changed data real-time and querying the changed data real-time. One proposal to handle a significant amount of updates is to store the updates separate from an index. Periodically, such as during off-peak hours, the index is updated in single (large) batch operation. The off-peak hours are referred to as a "batch window." However, such an index is not current. In order to query current data, the separate store must also be queried. However, such separate stores are not efficiently queryable.

To compound the problem, "batch windows" are disappearing as businesses become global in nature. Updates to indexed objects are roughly constant throughout a given day. Also, users are increasingly accustomed to services being online all the time. Therefore, temporarily disabling an index even during a short batch window is not advisable in order to attract and maintain a committed customer base.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
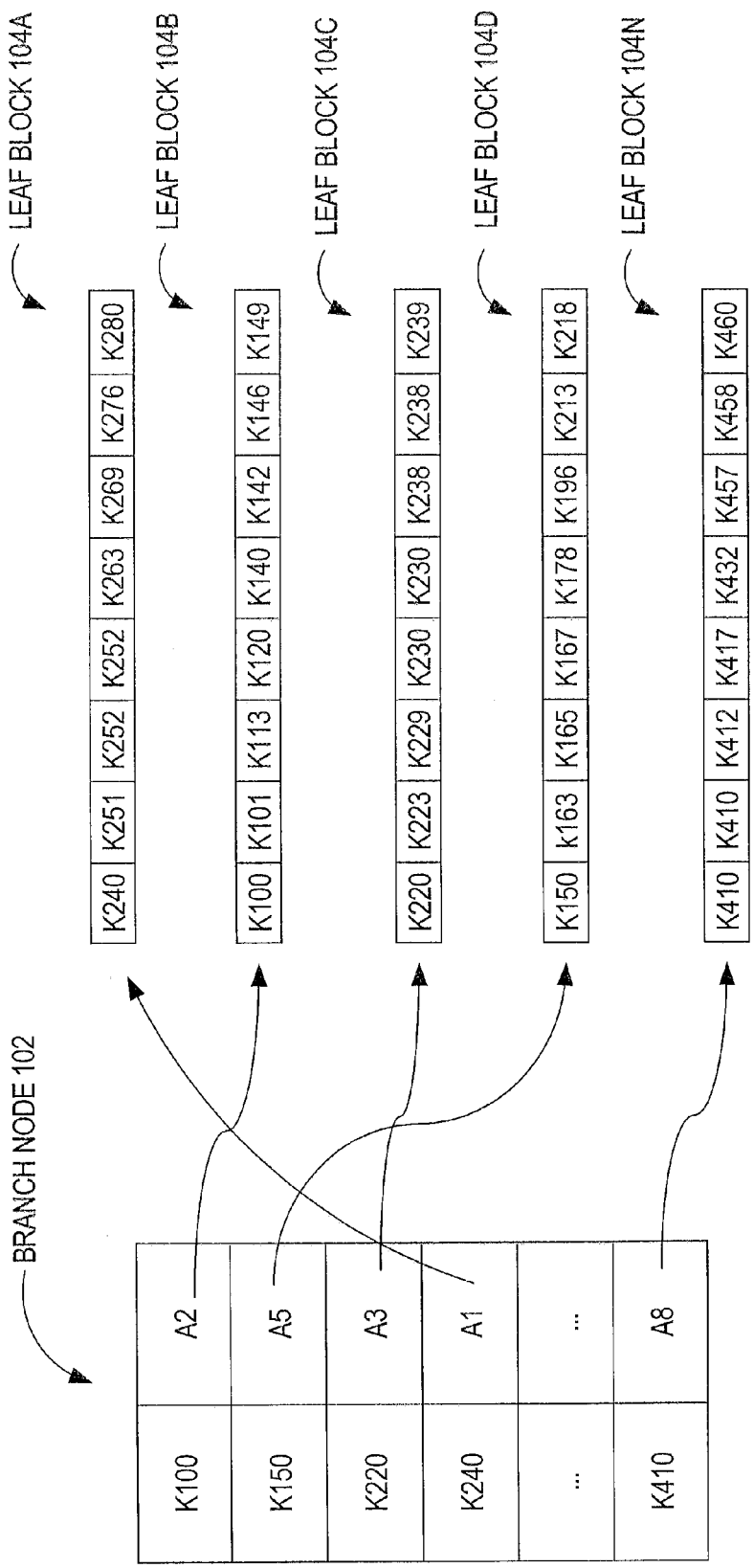
FIGS. 1A-D are block diagrams that depict a branch node and leaf blocks that are associated with the branch node, according to embodiments of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Cascading Index

One approach for reducing the amount of random I/Os on an index is to generate a multi-level index structure that comprises a base level index and one or more upper level indexes. The base level index is referred to herein as the "main index." The one or more upper level indexes are referred to herein as "journal indexes." Such a multi-level index is referred to herein as a "cascading index." The main index may resemble a traditional B-tree index and, typically, resides entirely in disk storage. One or more of the journal level indexes may reside in RAM.

An attribute of a cascading index is that maintenance thereof is performed by accumulating updates in one or more journal indexes before the main index is updated. Updates include the deletion of keys, the addition of keys, and the modification of existing keys.

The one or more journal indexes act as a journal for updates that are not yet merged into the main index. Therefore, only the upper-most journal index is updated directly. The remaining indexes of the cascading index are updated only during a "merge down" process between two journal indexes or between a journal index and the main index. Because a journal index may reside entirely in RAM, updates to the cascading index may be done without a significant amount of disk I/O. In contrast, current B-tree implementations require that, for each update, a disk I/O read and a disk I/O write of a single 8 KB block be performed. Therefore, whereas updates to a traditional B-tree index may be constant, updates to the main index of a cascading index are relatively rare.

General Overview

Techniques are provided for the efficient storage of a cascading index and for the efficient retrieval of information using a cascading index. In an embodiment, multiple leaf blocks that are referenced by a single branch node are stored sequentially in disk storage. A branch node is compressed using various techniques, such as the removal of addresses and key values from the branch node.

In an embodiment, a bloom filter is generated and associated with a branch node. The bloom filter is updated each time the branch node is updated. The bloom filter is used on queries to determine whether a particular key value exists in a leaf block associated with the bloom filter.

A reduced redo record is generated for updates that are part of a merge operation between two levels of a cascading index. As part of a merge operation, a reduced redo record is generated that comprises one or more "original" addresses of one or more data blocks that stored data before the merge operation, one or more updates that are part of the merge operation, and one or more "target" address of one or more data blocks that store data after the merge operation.

Embodiments of the invention are described in the context of cascading indexes. However, embodiments of the invention are also applicable in the context of non-real-time indexes, such as an index that is rebuilt periodically (e.g., once a day or once a week). In such indexes, similar in some respects to the main index of a cascading index, there is no incremental maintenance.

Clustering Updates

According to an embodiment of the invention, the updates to the cascading index are clustered in each journal index. Clustering of updates in a journal index refers to the ordering of the updates according to their respective key values. Clustering allows any lower level journal indexes and the main index to be maintained efficiently. Because updates are ordered in one or more journal indexes, keys in the main index may be ordered on disk. Ordering keys on disk may save disk space by a factor of two and greatly speed up range scans. A clustered set of keys are moved in bulk from a journal index to the main index. Thus, what would have been one read and write disk I/O (on the leaf block of the main index) per key results in only a few fully contiguous disk I/Os on the main index.

In traditional index maintenance, a minimum of two random 8 KB I/Os are typically required to update an index. In contrast, in embodiments of the invention, index updates are "amortized" 0.016/k 1 MB I/Os, where k ranges from 1 to 10. A k of 4 translates into a 100 times (herein 100×) reduction of disk I/O.

The number of journal indexes in a cascading index is governed by the size of the lower journal indexes relative to the amount of memory and the data being inserted. For most applications, a three level cascading index (i.e. two journal indexes) should be adequate. With a three level cascading index, an application may experience in the order of 50× reduction of the amount of disk I/O required to perform index update operations.

Maintaining a Cascading Index

For this section, the main index is referred to as L1, the adjacent journal index is referred to as L2, and any other journal indexes are referred to as L3, L4, etc.

In order to efficiently maintain L1, a relatively high number of keys per leaf block of L1 should be updated per merge operation (i.e., between L2 and L1). If the average L1 leaf block includes 400 keys, then the size of L2 is approximately 400/k times smaller than the size of L1. An efficient mechanism to maintain L1 is to read a large number of the "leaf blocks" of L2, for example, using an optimal disk I/O size of the I/O subsystem and then apply the read L2 leaf blocks to the L1 index. For example, if 1 MB of L2 leaf blocks is processed at a time, then that translates into 50,000 updates. Those would require 50,000/k blocks of L1 to be read and then written to disk, which is 1 MB+8 KB * (50,000/k)=(1+400/k) MB of disk I/O. Such reading and writing of L1 leaf blocks would also generate about 1/k MB of disk I/O for the branch blocks. Therefore, an L1-L2 merge operation per 50,000 L2 updates = (2 + 802/k) 1MB of disk I/O. (2 + 802/k) 1MB of disk I/O =
    1MB Read I/O    // Read of L2 chunk for merge
    + 400/k MB Read I/O    // Read of L1 leaf pages for the 50,000 keys
    + 1+ 400/k MB Write I/O // To write newly built L1 index leaf pages
    + 1/k MB Read I/O    // To Read L1 branch blocks
    + 1/k MB Write I/O    // To write newly built branch pages In the above calculations, k is the number of keys in the L2 index divided by the number of leaf blocks in the L1 index. Thus, k is an average number of keys in the L2 index that map to an L1 index block. A k factor may be defined on an arbitrary key range to imply that k refers to the same property as described above, applied to a narrower part of the index.

In the current index, inserting 50,000 keys would incur approximately 100,000 8 KB random disk I/Os. If disk I/O latency of an 8 KB block is assumed to be 5 ms and disk I/O latency of a 1 MB chunk is assumed to be 25 ms, then applying 50,000 updates to L1 directly would take approximately 500 s, whereas a L1-L2 merge would take approximately (0.005+20.05/k) s. Thus, an L1-L2 merge may take approximately ½s k amount of time that it currently takes to apply 50,000 updates to a typical index. If the 1 MB of disk I/O corresponding to the L1 leaf blocks is not perfectly aligned on optimal disk I/O boundaries, then 1 MB of disk I/O may take more than 25 ms. Assuming a worst case scenario, if 1 MB of disk I/O takes 2× more time than optimal, then the L1-L2 merge operation would take ⅟13 k amount of time that it currently takes to apply 50,000 updates to a typical index.

Index maintenance of L2 adds additional overhead to the cascading index. Applying 50,000 updates to L2 should not require 50,000 blocks to be read and written from L2; otherwise, the benefit of the L1/L2 cascade structure is severely diminished. Therefore, when L2 is relatively large, an additional level (i.e., L3) may be added "on top of" L2. Subsequently, index updates go directly into L3. Then, such index updates are merged into L2 using the same mechanism that is used to merge L2 and L1. A cost to move one user-initiated update (i.e., not a bulk merge update) from Lm+1 to Lm (where size of(Lm)=400*size of(Lm−1)/Km and where Km is the k factor at level m in the cascading index) is defined as the following:

$Cm = 0.016/Km$ 1 MB of disk I/O+$Cm-1$ $C1 = 0.016/K1$ 1 MB of disk I/O $C2 = 0.016/K2$ 1 MB of disk I/O+$0.016/K1$ 1 MB of disk I/O For each update to the cascading index, the update is applied to L3, then to L2 once, and then to L1 once. An advantage in the two levels of journal indexes is that L3 is in the order of 400×400 times smaller than L1. Therefore, if L1 is 1TB in size, then L3 is less than 10 MB in size. Updating L3 of this size is efficient because there is little wasted disk I/O bandwidth: L3 may fit in a cache, and the dirty blocks to be written are composed of mostly new data. Thus, a user-initiated update eventually makes its way through the different cascading index layers by means of bulk merge operations. As shown above, the cost of an individual update becomes progressively smaller at each level since the cost is amortized over all of the other updates that are part of a bulk merge operation. The formulae above show how this cost is computed.

Further, a cascading index allows a previously large number of small random disk I/Os to be converted into a smaller number of large contiguous disk I/Os. Such large contiguous disk I/Os may improve the performance of index updates by up to two orders of magnitude.

Super Leaf Block

According to an embodiment of the invention, a plurality of leaf blocks that are traditionally referenced by a branch node in the main index of a cascading index are stored sequentially and contiguously on disk, both before and after an update to any of the leaf blocks. All the leaf blocks associated with a branch node may be stored sequentially and contiguously. Alternatively, a subset of the leaf blocks associated with a branch node may be stored sequentially and contiguously. A plurality of leaf blocks that are stored sequentially and contiguously (i.e., with respect to each other) are collectively referred to herein as a "super leaf block."

Traditionally, leaf blocks are 8K in size and each branch node separately references 128 leaf blocks. In an embodiment of the invention, 128 leaf blocks may be viewed as a single super leaf block.

FIG. 1A is a block diagram that depicts a branch node 102 that includes an address for each of leaf blocks 104A-N. As indicated by the addresses in branch node 102 and the reference arrows, leaf blocks 104A-N are not stored sequentially. In typical implementations, each leaf block of leaf blocks 104A-N is stored, respective to the other leaf blocks, in widely different regions of disk storage.

Figure 1B:
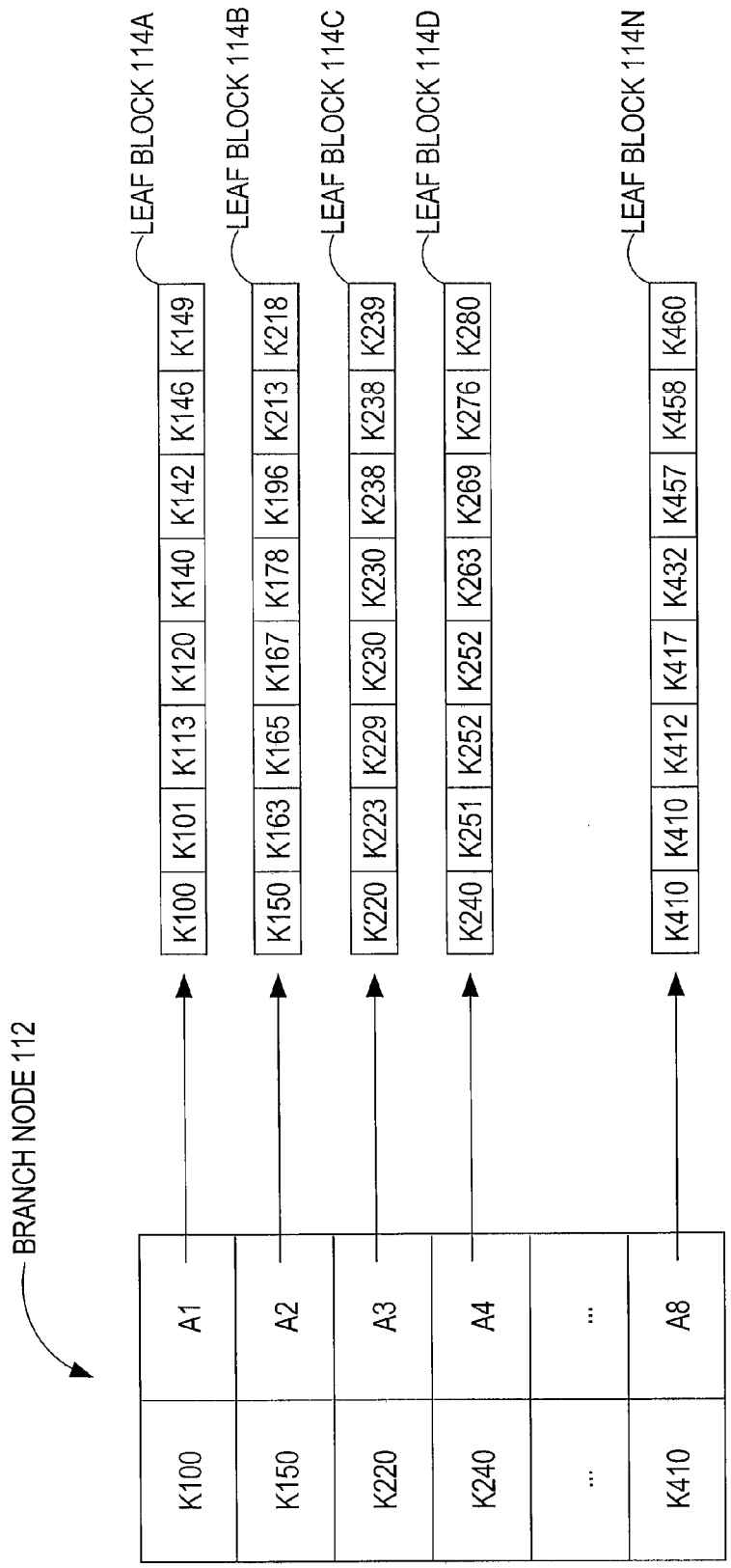

FIG. 1B is a block diagram that depicts a branch node 112 that is associated with leaf blocks 114A-N. Leaf blocks 114A-N are stored sequentially. Leaf blocks 114A-N may be considered, collectively, a single super leaf block. Leaf blocks 114A-N may not be the only leaf blocks associated with branch node 112. For example, branch node 112 may reference multiple super leaf blocks.

The description herein describes branch nodes as comprising actual key values that act as key separators. However, embodiments of the invention of the invention are not so limited. In an embodiment, a branch node comprises entries for actual key values that are each associated with a reference to the corresponding indexed value in the indexed object. Alternatively, each entry in the branch node may store all the values associated with the corresponding indexed value. Therefore, it may not be necessary to access a leaf block in response to a query on the cascading index if the branch node contains the necessary information.

In an embodiment, a branch node comprises incomplete key values referred to as "key separators." A key separator is a value in a branch node that indicates a difference between the last key in one leaf block and the first key in the next leaf block. A purpose of a key separator is to disambiguate key ranges. For example, an index indexes last names in a table. The last key value in a particular leaf block is "Smith" and the first key value in the next leaf block is "Smithsonian." A branch node for the two leaf blocks does not store the entire key value "Smithsonian"; rather the branch node stores the key separator "Smiths" to distinguish between the key values in the particular leaf block and the key values in the next leaf block.

Compression

Compression of indexes is currently not performed because compression is not compatible with real-time indexes, i.e., indexes that are modified in response to each update to the underlying indexed objects (e.g., tables) upon which the indexes are built. If parts of an index are compressed and continuously modified in response to each update, then those parts must be compressed for each update. However, compressing data items tends to be a CPU intensive operation. As a result, real-time indexes are currently not compressed.

According to an embodiment of the invention, elements of a cascading index, as disclosed herein, are compressed. Compression of elements in the main index of a cascading index is possible because the main index is not modified in response to each index update. The sequential storage of multiple leaf blocks is leveraged to achieve certain types of compression.

Address Reduction Compression

Figure 1C:
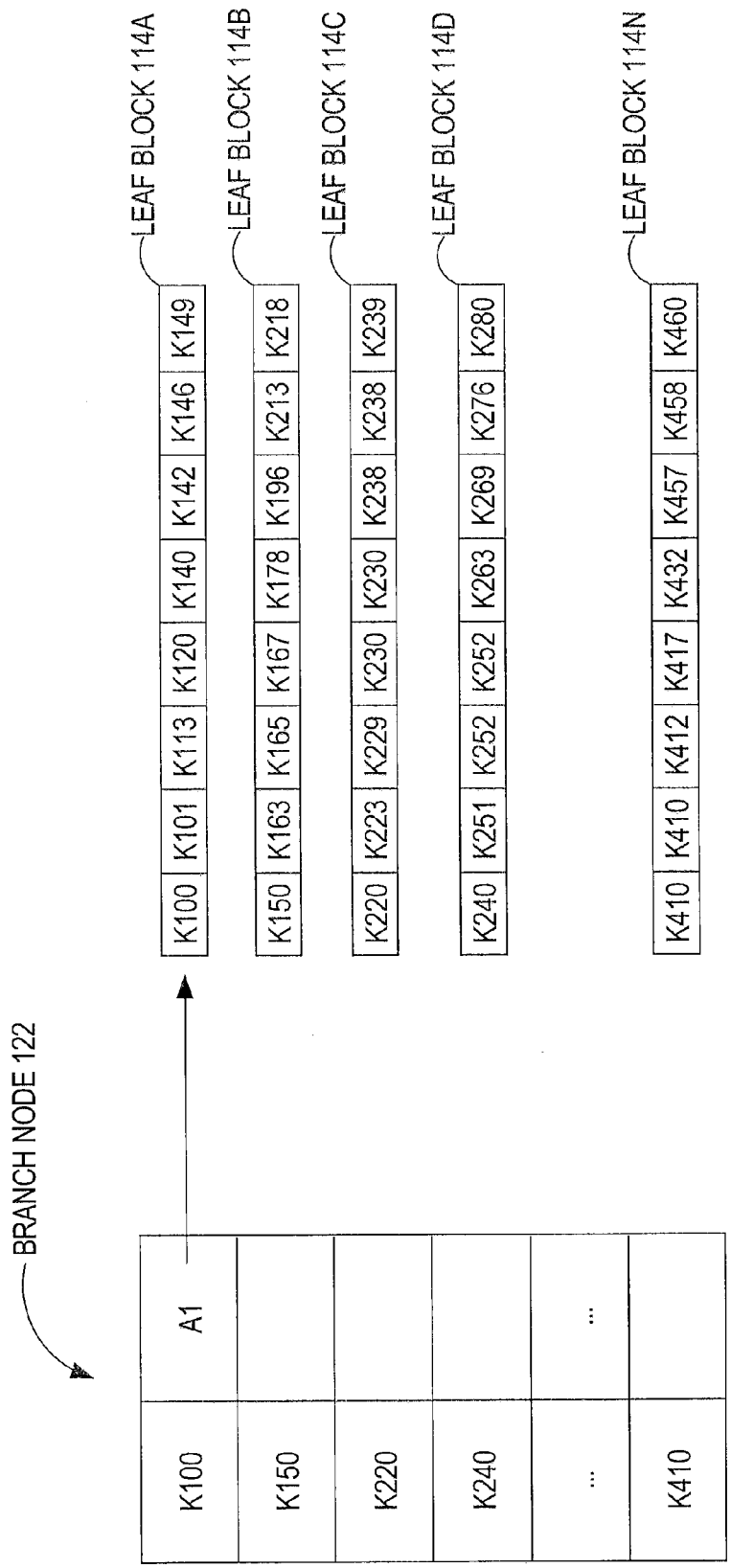

In an embodiment, multiple addresses to multiple leaf blocks in a super leaf block are removed from a branch node. FIG. 1C is a block diagram that depicts a branch node 122 where multiple addresses are removed. In the depicted example, except for the address to the first leaf block (i.e., leaf block 114A), all addresses are removed from branch node 122. This type of compression is referred to herein as "address reduction compression."

Address reduction compression is possible because multiple leaf blocks referenced by a single branch node are stored sequentially, which necessitates that the addresses of those leaf blocks are also sequential. If addresses comprise 50% of the data contained in a branch node, then the removal of all but one address results in approximately a 50% (i.e., 2×) reduction in the size of the branch node.

Key Value Compression

Another type of compression that may be performed on a branch node is the compression of key values (or key separators) in a branch node. This type of compression is referred to herein as "key value compression." In typical indexes, an 8 KB leaf block stores approximately 200 key values. In key value compression, the key values of multiple leaf blocks associated with a branch node are compressed. For example, if 1 MB of contiguously stored leaf blocks is compressed, then each 8 KB leaf block may store up to 1000-2000 key values. Thus, instead of storing key values or separator values as-is in the branch level, traditional data compression techniques may be used to "pack" this information into a lesser amount of space. As a result, more values are "packed" into the available space. Embodiments of the invention are not limited to any particular compression technique.

Key Reduction Compression

Another type of compression that may be performed on a branch node is the removal of key values (or key separators) from the branch node. This type of compression is referred to herein as "key reduction compression." Unless otherwise indicated, reference hereinafter to "keys" refers to either key values or key separators or both.

Figure 1D:
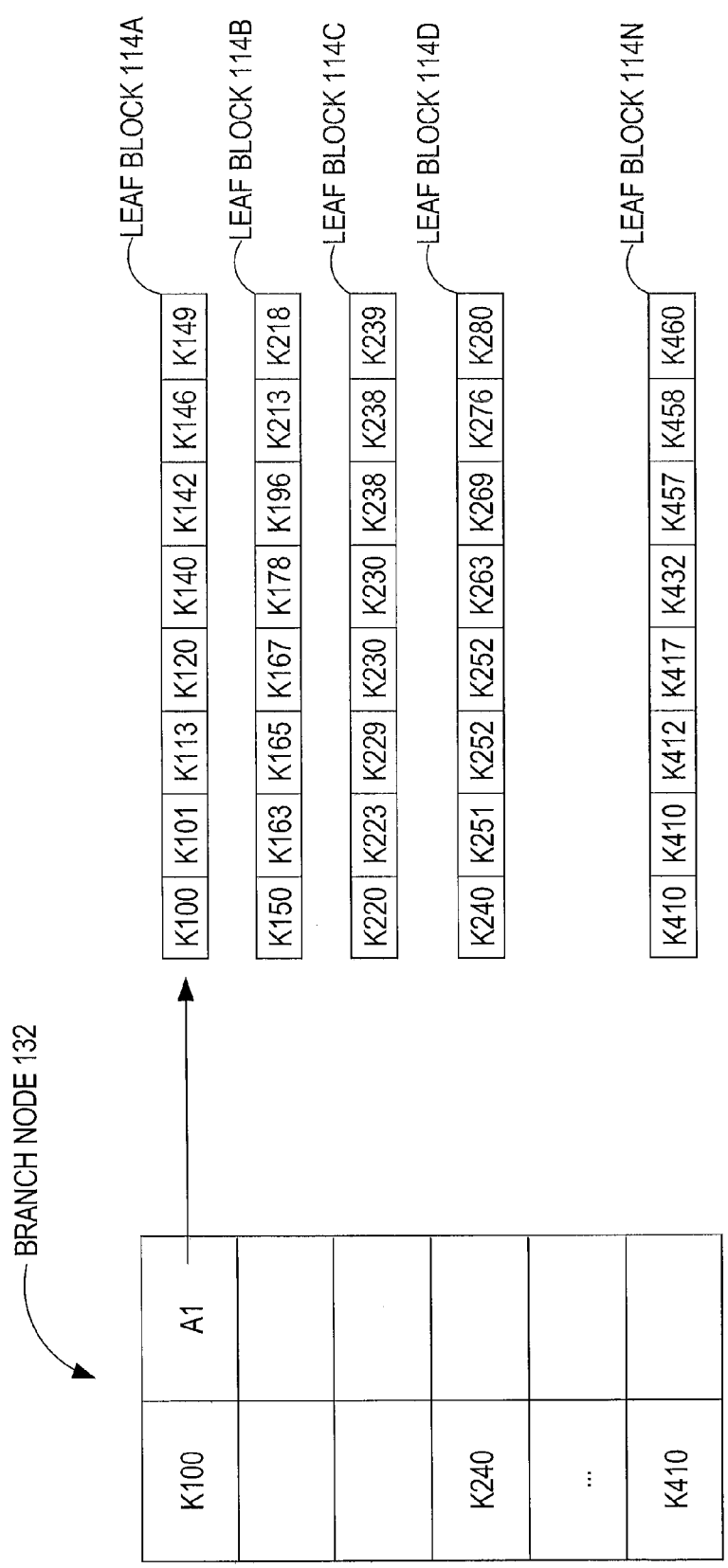

FIG. 1D is a block diagram that depicts a branch node 132 where key reduction compression is applied. For example, in FIG. 1B, branch node 112 includes six keys. In FIG. 1D, branch node 132 includes about one third of the keys (i.e., every third key is retained and the remaining keys are removed). If keys typically include 50% of a branch node, then key reduction compression alone results in roughly a 33% reduction in the size of the branch node.

If a branch node comprises key separators (instead of key values), then, as a result of key reduction compression, the size of each remaining key separator decreases. The reduction in the size of each remaining key separator is due, at least in part, to the fact that the remaining key separators represent a larger key range. A larger key range indicates that a smaller key separator is required to represent that key range.

A consequence of removing keys from a branch node is that a larger scan of the keys in a super leaf block may be required. For example, in FIG. 3D, if a merge operation between a journal index and the main index affects one or more keys in the key range of K100 and K240, then at least leaf blocks 114A-C must be read.

However, in some applications, range scans are common. A range scan is the reading of multiple leaf blocks at a time, e.g., from disk storage. Therefore, in such applications, there is little (if any) disk I/O penalty for reading more data from disk storage.

In an embodiment, the number of keys in a branch is tunable, or adjustable, either automatically or manually. For example, a user may specify '5' indicating that only every fifth key in a branch node is retained and the remaining keys are removed. As another example, a database system may determine that an average of fifteen leaf blocks is read for each query. As a result, the database system may change the number of keys that are retained in a branch node from every, e.g., fifth key to every fifteenth key.

If multiple types of compression are applied to a branch node, then the size of the branch node may experience an even more significant reduction. For example, in a typical implementation, a branch node includes 128 keys. If all but one address is removed and only every tenth key is retained, then, without any further compression, the size of the branch node is reduced by approximately 95%. In some cascading indexes, a 95% reduction in the size of a branch node may allow the branch node to be stored in RAM. If one or more branch nodes are stored in RAM, then, for each query on the cascading index, there may be one less disk I/O. Therefore, applying one or more of the compression techniques described above may result in both a reduction of the amount of storage required to store a cascading index and a reduction of the amount of disk I/O in response to queries and updates.

Bloom Filter

One mechanism that may be used to further avoid disk I/Os in the context of a query on a cascading index is to implement a Bloom filter. In response to a query, each level of the cascading index is checked to see if a particular key value is indexed. A Bloom filter may be used to determine whether the particular key value is indexed. Therefore, a Bloom filter may be implemented at each level of the cascading index. Alternatively, a Bloom filter may be implemented at only the main index.

A Bloom filter is a space-efficient probabilistic data structure that is used to test whether an element is a member of a set. False positives are possible, but false negatives are not. Elements may be added to the set, but are typically not removed from the set. As more elements are added to the set, the probability of false positives increases.

A Bloom filter may be implemented as a bit array of m bits. The bit array is associated with k different hash functions. Each hash function maps a key value to one of the m array positions. An empty Bloom filter is a filter where all the bits in the bit array are set to 0. To add an element to the Bloom filter, the element is inputted to each of the k hash functions. Each execution of the k hash functions outputs a position in the bit array. Each position in the bit array is set to 1.

To query the Bloom filter for an element, the element is inputted to each of the k hash functions to obtain k positions in the bit array (as before). If any of the k positions in the bit array are 0, then the element is not in the set. If all of the k positions in the bit array are 1, then the element may be in the set. Generally, as m and k increase relative to a particular number of elements in a set, the likelihood of false positives decreases.

With a Bloom filter associated with the main index, it is possible to avoid disk I/Os. If a Bloom filter is not used, then leaf blocks in the main index must be accessed. Therefore, the fact that the test of existence is approximate is not an issue because leaf blocks would have been accessed without a Bloom filter.

A Bloom filter may be implemented at any level in the cascading index. For example, a single Bloom filter may be implemented for the cascading index and associated with the main index. Therefore, whenever a journal index "pushes down" keys into the main index, the Bloom filter is updated based on those key values.

As another example, a separate Bloom filter may be associated with each branch node. Associating a Bloom filter with a branch node is a likely scenario because "push downs" are performed on a per branch node basis. Therefore, whenever a branch node is updated, a new Bloom filter may be generated based on the key values represented by the updated branch node.

As yet another example, a separate Bloom filter may be associated with each journal index in the cascading index. However, the utility of Bloom filters is highest in the lower levels of the cascading index because the top level index will most likely be maintained in RAM and processing data that is stored in RAM is significantly faster than first retrieving data that is stored in disk storage.

Merge and Compression Operation

In an embodiment, the (a) merge of updates from one level of a cascading index and another level of the cascading index and (b) compression of branch nodes are performed together, e.g., as part of a single database operation. A merge and compression operation may be performed as follows. First, the leaf levels of two respective levels in a cascading index are merged, e.g., between L3 and L2 or between L2 and L1. This leaf-level merge results in new block and key value information with which to update the branch nodes (i.e., at the lowest level in the index, whether L2 or L1. The lowest level branch nodes are referred to herein as level 1 branch nodes). Second, if the changes to the level 1 branch nodes will be insignificant (e.g., such that the level 1 branch nodes are still accurate), then the database operation ends. However, if the changes to the level 1 branch nodes will be significant, then the new contents of the branch nodes are computed. The new contents of the level 1 branch nodes may include new key values or key separators, new Bloom filters, new compression maps, etc. Third, changes to the level 1 branch nodes (e.g., in L1 or L2) may lead to changes to branch nodes at higher levels, such as level 2 and level 3 branch nodes (whether in L1 or L2). For each of these higher level branch nodes, the check in the second step above is performed.

Performing a merge operation is sufficiently computationally expensive that it is desirable to (1) perform a merge operation as few times as possible and (2) make as many modifications to L1 or L2 as possible in a single merge.

Benefits

As stated previously, a sequential disk I/O is one or two orders of magnitude faster than multiple random disk I/Os. Multiple random disk I/Os are inherent in typical indexes, such as B-trees. Thus, a benefit of embodiments of the invention is that the querying benefits of B-trees may be combined with the benefits of sequential disk I/O. Previously, these benefits were mutually exclusive.

For example, a typical disk I/O of 8 KB requires about 5 milliseconds. Therefore, inserting 50,000 keys into an index structure that resides in disk storage would involve 100,000 disk I/Os, which translates to approximately 500 seconds. However, a single disk I/O of 1 MB requires about 25 milliseconds. Although a single disk I/O of 1 MB of data is 3× longer than a single disk I/O of 8 KB of data, 125× more data is retrieved. To continue the example, inserting 50,000 keys into disk storage may only require 25 milliseconds, which is about a 20,000× speedup. Although a 20,000× speedup is theoretically possible in some situations, a more likely scenario is a 10× to 100× speedup in overall disk maintenance.

Backup and Recovery

Backup and recovery is an important aspect of database administration. If a database crashes and there was no way to recover the database to a current and consistent state right before the crash, then the devastating results to a business could include lost data, lost revenue, and customer dissatisfaction. Whether operating a single database or multiple databases that store hundreds of gigabytes or even terabytes of data, companies share a common factor: the need to back up important data and protect themselves from disaster by developing a backup and recovery plan.

A backup is a representative copy of data. This copy of data may include important parts of a database such as the control file, redo logs, and datafiles. A backup protects data from application error and acts as a safeguard against unexpected data loss, by providing a way to restore original data. Backups are divided into physical backups and logical backups. Physical backups are copies of physical database files. The phrase "backup and recovery" usually refers to the transfer of copied files from one location to another, along with the various operations performed on these files.

In contrast, logical backups contain data that is exported using SQL commands and stored in a binary file. Both committed and uncommitted changes may be recorded in redo log buffers. Logical backups are used to supplement physical backups. Restoring a physical backup means reconstructing the backup and making the backup available to a database server. To recover a restored backup, data is updated using redo records from a transaction log. The transaction log records changes made to the database after the backup was taken.

Crash recovery and instance recovery are performed automatically after an instance failure. In the case of media failure, a database administrator (DBA) initiates a recovery operation. Recovering a backup involves two distinct operations: rolling the backup forward to a more recent time by applying redo data, and rolling back all changes, made in uncommitted transactions, to their original state. In general, recovery refers to the various operations involved in restoring, rolling forward, and rolling back a backup. Backup and recovery refers to the various strategies and operations involved in protecting the database against data loss and reconstructing the database should a loss occur.

A backup is a snapshot of a datafile, tablespace, or database at a certain time. If periodic backups of the database have been made and data is lost, then users may apply the stored redo information to the latest backup to make the database current again. Users may restore an older backup and apply only some redo data, thereby recovering the database to an earlier point in time. This type of recovery is called incomplete media recovery. If the backup was consistent, then users are not required to apply any redo data.

A simple example of media recovery illustrates the concept. Suppose a user makes a backup of a database at noon. Starting at noon, one change to the database is made every minute. At 1 p.m. one of the disk drives fails, causing the loss of all data on that disk. Fortunately, all changes are recorded in the redo log. The user may then restore the noon backup onto a functional disk drive and use redo data to recover the database to 1 p.m., reconstructing the lost changes.

Typically, for each data block that is written to disk storage, there is a corresponding redo record that includes the address of the data block on disk and the contents of the data block. Applying current redo logging techniques to a cascading index, as disclosed herein, requires that each merge operation of data between two levels of the cascading index generates an amount of redo records corresponding to the amount of data that is written to disk storage as a result of the merge operation.

For example, a journal index in a cascading index includes 1 MB of journal entries that indicate updates to the underlying indexed object(s), such as a table. The 1 MB of journal entries spans a particular key value range. The 1 MB of journal entries is merged with 100 MB of key values in the main index of the cascading index. The result of such a merge is written to disk storage. Under typical redo implementations, approximately 100 MB of redo records are generated to capture the approximately 100 MB of disk I/O (i.e., as a result of the merge operation).

According to an embodiment of the invention, one or more redo records are generated only for the data, from a journal index, that is merged with data in a lower level index, such as the main index. Such redo records are referred to herein as "reduced redo records." Therefore, given the example above, one or more reduced redo records are generated that include the 1 MB of journal entries that is merged with the 100 MB of keys in the super leaf block(s). For example, a single reduced redo record may be generated for all the updated keys in a single bulk merge operation. As another example, multiple reduced redo records are generated for a single bulk merge operation (e.g., one reduced redo record per super leaf block that is modified in a bulk merge operation). In either example, a single reduced redo record corresponds to multiple updates to the leaf blocks in the main index. In addition to the changes in key values that represent multiple updates, each reduced redo record includes (a) one or more addresses (referred to as original addresses) of leaf block(s) that will change as a result of the bulk merge operation and (b) one or more addresses (referred to as target addresses) of leaf block(s) that changed as a result from the bulk merge operation.

In an embodiment, a reduced redo record contains a length that indicates how much data to read from an original address and, optionally, a length that indicates how much data to write to a target address. Thus, instead of including a large plurality of original and/or target addresses, a reduced redo record may include one or a relatively few addresses that are each associated with a length.

Application of Reduced Redo Records

In current implementations of applying redo records in a database system, redo is applied on a per-block basis. Therefore, there is no inter-block dependency. In contrast, in embodiments of the invention, there is inter-block dependency, particularly because 1 MB of journal entries spans multiple leaf blocks. The dependency is between, e.g., 100 MB of input combined with 1 MB of changes producing approximately 100 MB of output. Thus, application of reduced redo records must be performed in the correct causal order.

According to an embodiment of the invention, a recovery system of a database is configured to apply reduced redo records as disclosed herein. The application of reduced redo records to data stored in disk storage may be performed in response to a failure. Non-limiting examples of failures include a statement failure, a process failure, an instance failure, an application error, or a media failure.

Figure 2:
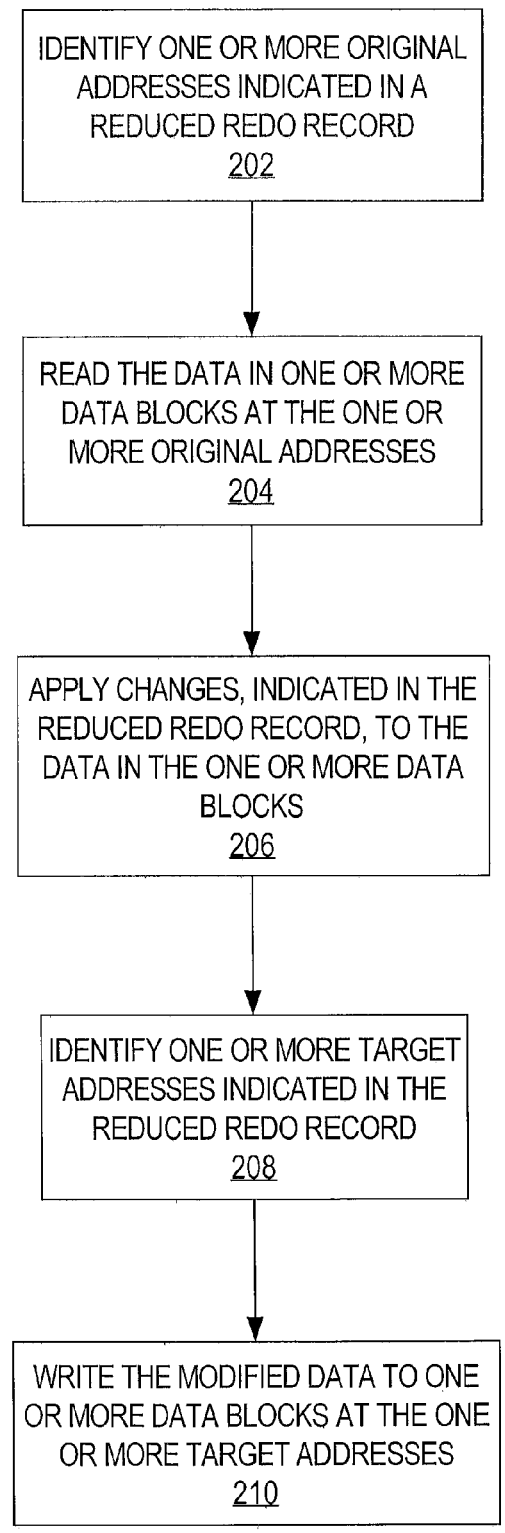
FIG. 2 is a flow chart that depicts how a reduced redo record may be applied, according to an embodiment of the invention.

FIG. 2 is a flow chart that depicts how a reduced redo record is applied, according to an embodiment of the invention. A reduced redo record specifies (a) one or more original (database) addresses of one or more original data blocks; (b) a plurality of journal entries corresponding to a plurality of updates; and (c) one or more target (database) addresses of one or more target data blocks. A reduced redo record is generated for each bulk merge between a journal index and the main index and, optionally, between any two journal indexes. A database recovery system may perform the following steps in response to reading a reduced redo record.

At step 202, the recovery system identifies one or more original addresses indicated in the reduced redo record. At step 204, the recovery system reads data in one or more data blocks at the one or more original addresses. At step 206, the recovery system applies changes, indicated in the reduced redo record, to the data to generate modified data. The changes may comprise insertions of key values into leaf blocks of the main index and/or deletions of key values from leaf blocks of the main index. At step 208, the recovery system identifies one or more target addresses indicated in the reduced redo record. At step 210, the recovery system writes the modified data to the one or more data blocks at the one or more target addresses. The recovery system performs the same operations for each subsequent reduced redo record until the database system is recovered to a consistent state before the failure.

Thus, for proper recovery, the recovery system must guarantee that the original data blocks have been correctly recovered. In other words, in order to recover first data, the recovery system must have previously recovered second data that the first data depends on.

In an embodiment of the invention, a reduced redo record is generated for all bulk merges, including merges between the main index and a journal index and merges between higher level journal indexes.

A benefit of embodiments of the invention is that, in a cascading index, there is a significant reduction in the amount of redo information that is generated when data is merged between two levels of the cascading index. Instead of generating redo records for, e.g., 100 MB of leaf blocks that are changed by 1 MB of updates, one or more reduced redo records are generated for only the 1 MB of updates. The application of reduced redo should not be any longer than application of existing redo.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
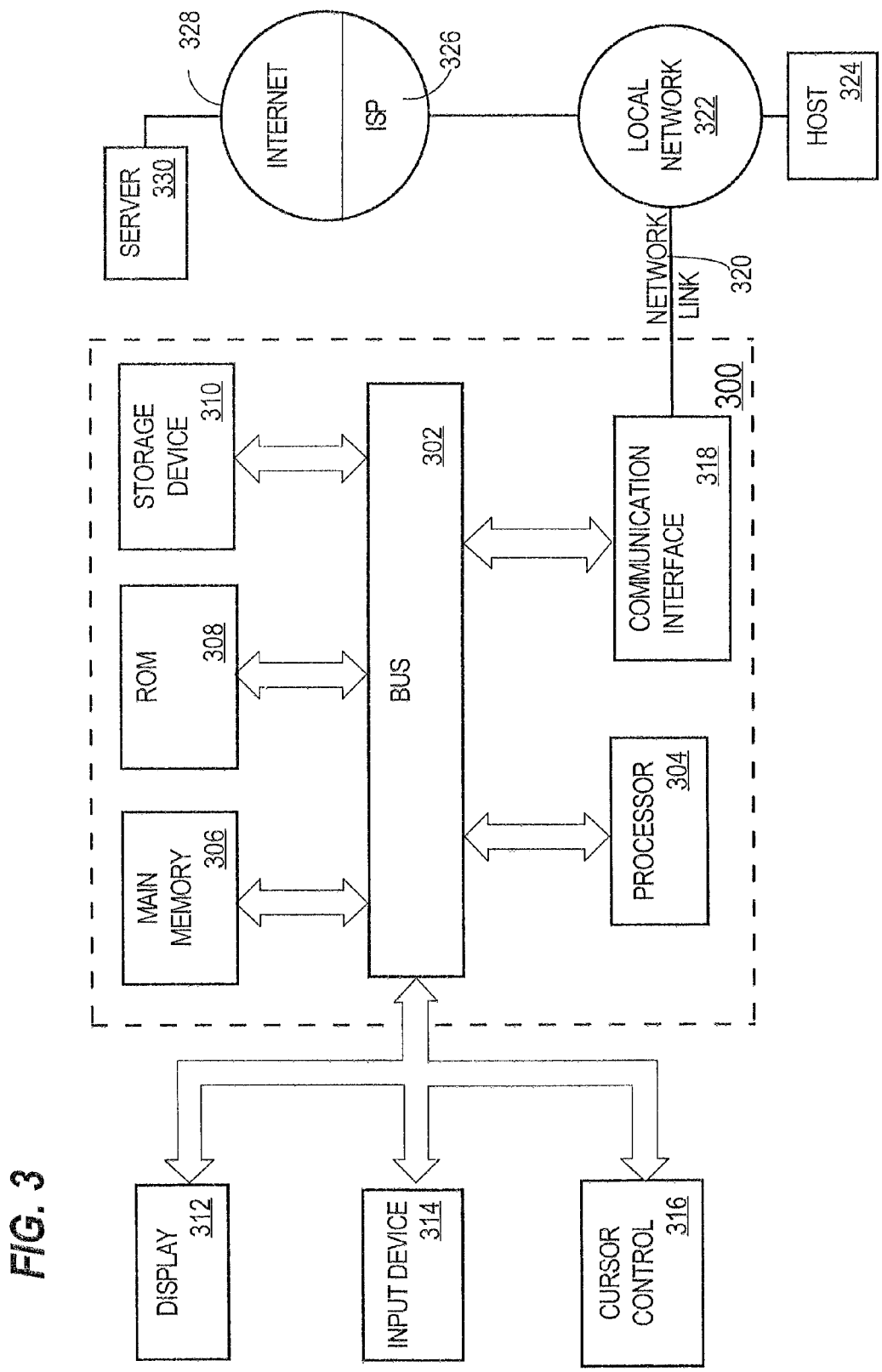
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving a plurality of updates that affect a multi-level index that comprises a plurality of index levels that includes at least a journal index and a main index;
applying the plurality of updates to the journal index without applying the plurality of updates to the main index;
in response to determining that one or more criteria are satisfied, removing the plurality of updates from the journal index and applying the plurality of updates to the main index;
processing a transaction that will result in one or more particular changes to data in one or more original data blocks that are part of a leaf level of the main index;
before committing the transaction, generating and storing one or more redo records;

wherein each redo record of the one or more redo records indicates (a) a first address of at least one data block of the one or more original data blocks, (b) at least one of the one or more particular changes, and (c) a second address of at least one data block of one or more target data blocks that reflect the at least one of the one or more particular changes;

wherein the method is performed by one or more computing devices.

2. The method of claim 1, wherein:
a first redo record of the one or more redo records includes a length value that indicates how much data to read, when processing the first redo record as part of a database recovery process, beginning at the first address.

3. The method of claim 1, wherein:
the one or more original data blocks are a plurality of original data blocks;
the one or more target data blocks are a plurality of target data blocks;
each redo record indicates only one address associated with the plurality of original data blocks and only one address associated with the plurality of target data blocks.

4. The method of claim 1, further comprising, as part of a database recovery process, for each redo record of the one or more redo records: identifying an original address indicated in said each redo record; reading, based on the original address, first data from a data block located at the original address; applying the one or more changes indicated in the redo record to the first data to create modified data; identifying a target address indicated in said each redo record; and writing the modified data to one or more data blocks beginning at the target address.

5. The method of claim 4, wherein applying the one or more changes comprises adding one or more values to the first data or deleting one or more values from the first data.

6. The method of claim 1, wherein the main index is stored in persistent storage while the journal index is stored in memory.

7. The method of claim 1, wherein the transaction involves merging changes reflected in the journal index with the main index.

8. The method of claim 7, wherein: the one or more original data blocks are a plurality of original data blocks; the one or more target data blocks are a plurality of target data blocks; merging the changes comprises combining the changes with data contained in the plurality of original data block to produce combined data that is stored in the plurality of target data blocks.

9. One or more non-transitory storage media carrying instructions which, when executed by one or more processors, cause:
receiving a plurality of updates that affect a multi-level index that comprises a plurality of index levels that includes at least a journal index and a main index;
applying the plurality of updates to the main index;
in response to determining that one or more criteria are satisfied, removing the plurality of updates from the journal index and applying the plurality of updates to the main index;
processing a transaction that will result in one or more particular changes to data in one or more original data blocks that are part of a leaf level of the main index;
before committing the transaction, generating and storing one or more redo records;
wherein each redo record of the one or more redo records indicates (a) a first address of at least one data block of the one or more original data blocks, (b) at least one of the one or more particular changes, and (c) a second address of at least one data block of one or more target data blocks that reflect the at least one of the one or more particular changes.

10. The one or more non-transitory storage media of claim 9, wherein:
a first redo record of the one or more redo records includes a length value that indicates how much data to read, when processing the first redo record as part of a database recovery process, beginning at the first address.

11. The one or more non-transitory storage media of claim 9, wherein:
the one or more original data blocks are a plurality of original data blocks;
the one or more target data blocks are a plurality of target data blocks;
each redo record indicates only one address associated with the plurality of original data blocks and only one address associated with the plurality of target data blocks.

12. The one or more non-transitory storage media of claim 9, wherein the instructions, when executed by the one or more processors, further cause, as part of a database recovery process, for each redo record of the one or more redo records: identifying an original address indicated in said each redo record; reading, based on the original address, first data from a data block located at the original address; applying the one or more changes indicated in the redo record to the first data to create modified data; identifying a target address indicated in said each redo record; and writing the modified data to one or more data blocks beginning at the target address.

13. The one or more non-transitory storage media of claim 12, wherein applying the one or more changes comprises adding one or more values to the first data or deleting one or more values from the first data.

14. The one or more non-transitory storage media of claim 9, wherein the main index is stored in persistent storage while the journal index is stored in memory.

15. The one or more non-transitory storage media of claim 9, wherein the transaction involves merging changes reflected in the journal index with the main index.

16. The one or more non-transitory storage media of claim 15, wherein: the one or more original data blocks are a plurality of original data blocks; the one or more target data blocks are a plurality of target data blocks; merging the changes comprises combining the changes with data contained in the plurality of original data block to produce combined data that is stored in the plurality of target data blocks.

17. A system comprising:
one or more processors;
one or more non-transitory storage media carrying instructions which, when executed by one or more processors, cause:
receiving a plurality of updates that affect a multi-level index that comprises a plurality of index levels that includes at least a journal index and a main index;
applying the plurality of updates to the journal index without applying the plurality of updates to the main index;
in response to determining that one or more criteria are satisfied, removing the plurality of updates from the journal index and applying the plurality of updates to the main index;
processing a transaction that will result in one or more particular changes to data in one or more original data blocks that are part of a leaf level of the main index;

before committing the transaction, generating and storing one or more redo records;
wherein each redo record of the one or more redo records indicates (a) a first address of at least one data block of the one or more original data blocks, (b) at least one of the one or more particular changes, and (c) a second address of at least one data block of one or more target data blocks that reflect the at least one of the one or more particular changes.

18. The system of claim 17, wherein:
a first redo record of the one or more redo records includes a length value that indicates how much data to read, when processing the first redo record as part of a database recovery process, beginning at the first address.

19. The system of claim 17, wherein:
the one or more original data blocks are a plurality of original data blocks;
the one or more target data blocks are a plurality of target data blocks;
each redo record indicates only one address associated with the plurality of original data blocks and only one address associated with the plurality of target data blocks.

20. The system of claim 17, wherein the instructions, when executed by the one or more processors, further cause, as part of a database recovery process, for each redo record of the one or more redo records:
identifying an original address indicated in said each redo record;
reading, based on the original address, first data from a data block located at the original address;
applying the one or more changes indicated in the redo record to the first data to create modified data;
identifying a target address indicated in said each redo record; and
writing the modified data to one or more data blocks beginning at the target address.

21. The system of claim 20, wherein applying the one or more changes comprises adding one or more values to the first data or deleting one or more values from the first data.

22. The system of claim 17, wherein the main index is stored in persistent storage while the journal index is stored in memory.

23. The system of claim 17, wherein the transaction involves merging changes reflected in the journal index with the main index.

24. The system of claim 23, wherein:
the one or more original data blocks are a plurality of original data blocks;
the one or more target data blocks are a plurality of target data blocks;
merging the changes comprises combining the changes with data contained in the plurality of original data block to produce combined data that is stored in the plurality of target data blocks.

* * * * *